(12) United States Patent
Fuller et al.

(10) Patent No.: US 11,012,521 B1
(45) Date of Patent: May 18, 2021

(54) DEVICE ISOLATION WITHIN A SHARED VIRTUAL NETWORK

(71) Applicant: Amazon Technologies, Inc., Seattle, WA (US)

(72) Inventors: Daniel Robert Fuller, Herndon, VA (US); David Brian Lennon, Reston, VA (US); Michael Tyler Borgerding, Herndon, VA (US); Piyush Mathur, Redmond, WA (US); Siddartha Saddala, Ashburn, VA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/144,980

(22) Filed: Sep. 27, 2018

(51) Int. Cl.
| | |
|---|---|
| *H04L 29/08* | (2006.01) |
| *H04L 12/24* | (2006.01) |
| *H04L 12/26* | (2006.01) |

(52) U.S. Cl.
CPC ............ *H04L 67/22* (2013.01); *H04L 41/046* (2013.01); *H04L 43/08* (2013.01)

(58) Field of Classification Search
None
See application file for complete search history.

(56) References Cited

U.S. PATENT DOCUMENTS

2016/0359917 A1* 12/2016 Rao ..................... H04L 43/0811
2017/0111236 A1* 4/2017 Bielenberg ............. H04L 41/22

* cited by examiner

*Primary Examiner* — Cai Y Chen
(74) *Attorney, Agent, or Firm* — Nicholson DeVos Webster & Elliott LLP

(57) ABSTRACT

Techniques for defining and enforcing a set of rules that regulate network activity on a virtual network within a provider are described. An activity rule that regulates network activity on a virtual network within a provider network is received, the virtual network shared by a first customer of the provider network to allow other customers of the provider network to connect resource instances to the virtual network. Network activity data is received from a monitoring agent within the provider network, the network activity data relating to an activity of a first resource instance of a first other customer on the virtual network. The activity of the first resource instance is determined to violate the activity rule. The first resource instance is isolated from at least a portion of the virtual network.

18 Claims, 8 Drawing Sheets

| Vnid 205 | RuleId 210 | ParticipantIds 215 | ResourceIds 220 | Metric 225 | TriggerCondition 230 | Action 235 | ActionParameters 240 | Expiration 245 |
|---|---|---|---|---|---|---|---|---|
| vn12891 | 00001 | <CustomerIdA>, <CustomerIdB>, … | <ResourceId1>, <ResourceId2>, … | Bandwidth | >100 Mb/s | Source Limit | Exceptions: SSH | <DateA> |
| vn12891 | 00002 | * | * | HTTP | >10 Mb/s | Source Limit | HTTP, 2Mb/s | N/A |
| vn12891 | 00003 | * | * | IP Addresses | >5 | Detach, Notify Participant | <=5 | N/A |
| vn12891 | 00004 | <CustomerIdA> | * | Bandwidth && Packet Rate | >100 Mb/s >10000 t/s | Global Source Limit | Exceptions: None | N/A |
| vn12891 | 00005 | * | <ResourceId5> && <ResourceId7> | Packet Rate | >1000 t/s | Destination Limit | igw-123754, subnet-1234 | N/A |

Rule 250 → (row 1)
Rule 255 → (row 2)
Rule 260 → (row 3)
Rule 265 → (row 4)
Rule 270 → (row 5)

*FIG. 2*

DEVICE ISOLATION WITHIN A SHARED VIRTUAL NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the following figures.

FIG. 2 illustrates a set of rules that regulate the network activity of compute resources connected to the virtual network according to some embodiments.

DETAILED DESCRIPTION

Figure 1:
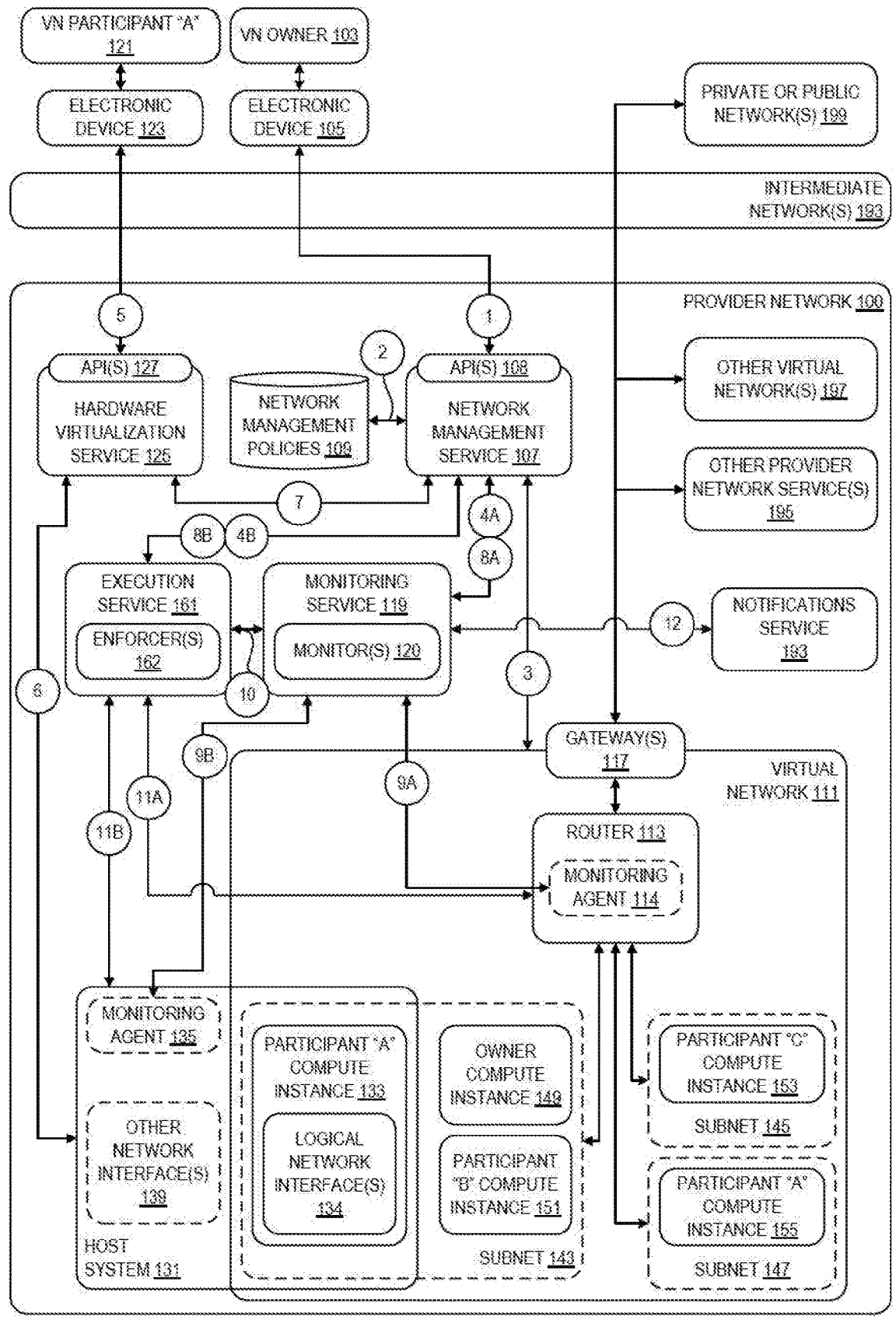
FIG. 1 illustrates an environment for regulating compute resources connected to a virtual network within a provider network according to some embodiments.

Various embodiments of methods, apparatus, systems, and non-transitory computer-readable storage media for isolating compute resources connected to a shared virtual network. In addition to providing virtualization technologies, a provider network can offer customers the ability to create virtual networks within the provider's network. The customer can use these virtual networks to route communications between the customer's provider-based compute resources and, in some cases, the customer's on-premises networks. In some cases, the customer may want to share the virtual network by permitting other customers to "plug" their own provider-based compute resources into the virtual network. With a shared virtual network, the creator (also referred to as the virtual network owner or administrator) of the virtual network and the other customers (also referred to herein as virtual network participants) can develop interconnected applications without setting up virtual private network peering, dedicated links, or complex routing arrangements between their respective compute resources. However, from the perspective of the virtual network owner, participant-controlled compute resources pose a threat to the operation of the virtual network given that the software executing on the participants' compute resources is outside of the control of the virtual network owner. Unregulated, a participant's compute resource can negatively impact the virtual network by degrading or interrupting network service, engaging in malicious activity, etc.

To address these and other problems, aspects of the present disclosure relate to a provider network that enables virtual network owners to enforce a set of "rules of the road" that regulate participant compute resource behavior on the virtual network. The rules may be globally enforced (e.g., on all participant- and owner-controlled compute resources) or applied to specific participants or groups of participants. So long as a participant does not violate a rule, the owner ensures that the participant's activity on the network will be unimpeded. If a rule is violated, however, the owner can specify one or more actions to be taken. These actions partially or completely isolate the participant's compute resource from the virtual network (e.g., shutting off a certain type of network traffic, "unplugging" the participant's compute resource from the virtual network).

At a high level, the provider network provides the virtual network owner with oversight and management capability through a set of processes carried out within the provider network: collecting virtual network activity data, monitoring the collected data for rules violations, and enforcing the violated rule. In some embodiments, these processes are out-of-band relative to the virtual network in that the messaging between the processes does not involve transit of the management related data through the virtual network. The provider network instantiates monitoring agents to be executed alongside the provider network resources at one or more endpoints of the virtual network (e.g., at computer systems hosting participants' compute resources, at routing logic that handles the routing of traffic within the virtual network, etc.). The monitoring agents collect network activity data (e.g., bandwidth consumption, address allocations, transaction rate, etc.) and report the data to one or more monitoring processes (or monitors), also within the provider network. Each monitor evaluates the received network activity of one or more compute resources against one or more rules. For example, one monitor might compare the bandwidth utilization of each compute resource within a virtual network and compare each compute resource's utilization against a limit specified in a rule. As another example, one monitor might compare each of the reported network activity metrics from a specific compute resource against each of the applicable rules associated with the virtual network. If a rules violation occurs, the monitor sends a message to an enforcement process (or enforcer) that takes action against the compute resource that violated a rule. The violated rule defines the action, which, as indicated above, may range from limiting virtual network connectivity to "unplugging" the bad actor from the virtual network.

FIG. 1 illustrates an environment for regulating compute resources connected to a virtual network within a provider network according to some embodiments. A provider network 100 provides customers with the ability to utilize one or more of a variety of types of computing-related resources such as compute resources (e.g., executing virtual machine (VM) instances), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute resources, a storage service that can store data objects, etc.

To provide these and other computing-related resources, the provider network 100 often relies upon virtualization techniques. For example, virtualization technologies, such as a hypervisor or a virtual machine monitor (VMM), may be described as the software, firmware, and/or hardware that provides an execution environment for the virtual machines (VMs) on a host system. These virtualization technologies provide customers with the ability to control or utilize compute resources, sometimes referred to as compute instances, within the provider network. Such compute resources include a virtual machine (VM) executing a guest operating system (O/S) that operates using a hypervisor that may or may not further operate on top of an underlying host O/S, a container that may or may not operate in a VM, an instance that can execute on "bare metal" hardware without an underlying hypervisor, executing batch jobs, executing code without provisioning servers, etc. One or multiple compute instances can be implemented using a single electronic device or host system. Thus, a customer may directly utilize a compute instance hosted by the provider network to perform a variety of computing tasks, or may indirectly utilize a compute instance by submitting code to be executed by the provider network, which in turn utilizes a compute instance to execute the code (typically without the customer having any control of or knowledge of the underlying compute instance(s) involved).

The customer of provider network 100 may utilize one or more user accounts that are associated with a customer account, though these terms may be used somewhat interchangeably depending upon the context of use. Customers, such as a virtual network owner 103 and virtual network participant 121 communicate with the provider network via their respective electronic devices 105, 121 and one or more intermediate networks 193. Communications to and from the customers' devices 105, 123 are handled by one or more interface(s), such as through use of application programming interface (API) calls that support a console such as a web- or command-line based application, etc. The interface(s) may be part of, or serve as a front-end to, a control plane of the provider network 100 that includes "backend" services supporting and enabling the services that may be more directly offered to customers.

One such service is the deployment of customer-controlled virtual networks within the provider network 100. In some embodiments, the provider network 100 employs internet protocol (IP) tunneling technology to overlay a virtual network on the physical infrastructure associated with the provider network 100. The provider network may leverage its physical infrastructure to instantiate compute instances that communicate via the virtual network, such as the virtual machines executed on host systems using the virtualization technologies described above. The provider network may further leverage its physical infrastructure to provide networking components that support the virtual network, such as routers, switches, network address translators (NATs), gateways, etc., each of which may be implemented as software, hardware, or as a combination thereof. In at least some embodiments of a virtual network within a provider network 100, the networking components may be implemented as software entities executing on general or special purpose hardware of the provider network 100. For example, a virtual router may be implemented in a distributed manner as part of the virtualization management software executing on each of the host systems supporting compute resources connected to the virtual network. Network traffic to and from the compute resources executing on a host system may pass through the virtual router, e.g., as it is processed by the hypervisor or VMM. Alternatively, the networking components may be virtual components remotely located from host systems supporting the compute instances connected to the virtual network, or physical networking devices of the service provider system 100.

When creating a virtual network, the customer becomes that virtual network's owner. In some embodiments, the virtual network owner may specify an IP address space for the virtual network (e.g., an Internet Protocol Version 4 (IPv4) Classless Inter-Domain Routing (CIDR) block, e.g., 172.31.0.0/20 or 10.0.0.0/16, or alternatively an Internet Protocol Version 6 (IPv6) CIDR block, e.g., 2600:1f16:67d:2000::/56). The IP address space may be referred to as a local or private (to the virtual network) IP address space. In some embodiments, virtual networks may be required to use IP address ranges within the private IP address spaces as defined by Internet Engineering Task Force (IETF) Request for Comments (RFC) 1918 for IPv4 as their local IP address space. In some embodiments, virtual networks may use IP address ranges within the private IP address space as defined by RFC 4193 for IPv6 (fc00::/7) as their local IP address space. In some embodiments, virtual networks use public IPv4 or IPv6 address ranges in their virtual networks as their local IP address space.

In some embodiments, the virtual network owner subdivides a virtual network into two or more subnetworks, or subnets. Subnets allow a customer to control the routing of traffic within and amongst subnets. For example, some virtual networks may include both a private gateway (to connect to a customer network outside of the provider network) and an internet gateway (to connect compute resources within the virtual network to the Internet). A customer can allow communications between compute resources within one subnet and the internet gateway while denying communications between that subnet and the private gateway, and vice versa with another subnet.

In some embodiments, the virtual network owner shares the virtual network with other customers. The virtual network owner may share the network publicly, allowing any provider network customer to connect compute resources to the virtual network, or may share the virtual network with a specified list of customers (e.g., other customers within the same business as the virtual network owner). For example, if the virtual network owner is an information technology (IT) employee of a company, the virtual network owner may share the virtual network with other employees of the company.

In the example illustrated in FIG. 1, a virtual network owner 103 has established a virtual network 111 within the provider network 100 and, as described below, sometime later a participant launches a compute instance within the virtual network 111.

A network management service 107 allows customers to create and manage their virtual networks. The virtual network owner 103 manages the virtual network 111 via the network management service 107. At circle '1', the virtual network owner 103 communicates with the network management service 107 via an electronic device 105 and one or more APIs 108. API(s) 108 allow the customer to make calls to the provider network 100 to create a virtual network, to define or modify the configuration and/or behavior of the virtual network (e.g., IP address space, subnets, gateways, endpoints, routing tables, etc.), and to share the virtual network with other customers. At circle '2', the network management service 107 stores or updates the data that define the configuration and behavior of the virtual network in a network management policies data store 109. The network management service 107 creates or updates the virtual network 111, as indicated at circle '3', based on the commands issued by the virtual network owner 103 to the API(s) 108.

In this example, the virtual network 111 includes a router 113 and is subdivided into subnets 143, 145, and 147. Several participants and the owner have compute instances 149, 151, 153, and 155 within the virtual network 111 (the virtual network participant "A" 121 launches compute instance 133 in the description below). The virtual network 111 further includes one or more gateways 117 that allow compute instances within the virtual network to communicate with networks or services outside of the virtual network, such as private or public networks 199 (e.g., a private corporate intranet or the public internet), other virtual networks 197 within the provider system, and other provider network services 195.

In the case of a shared virtual network, the network management service 107 allows the virtual network owner to define rules as part of the network management policies that regulate participant behavior. These rules regulate when devices are "unplugged" from or otherwise constrained within the virtual network by defining a one or more conditions, that, when met, cause one or more responsive actions to be taken by the provider network. The conditions associated with a rule may target a certain participant, resource, and/or network activity or be generally applicable to all of the compute resources connected to the virtual network. Likewise, the action(s) associated with a rule can range from slightly limiting or throttling a compute resource's activity on the network to completely shutting down the compute resource's ability to communicate on the network. Exemplary rules, including conditions and actions, are presented and described with reference to FIG. 2.

At circle '4A', the network management service 107 sends one or more messages to a monitoring service 119 to monitor for the conditions associated with the rules. The monitoring service 119 configures one or more monitors 120, which are software processes that monitor for the conditions that trigger a violation of a rule. The number of monitors per rule is implementation specific: in some embodiments, a single monitor may evaluate multiple rules; in other embodiments, a single monitor may evaluate a portion of a single rule. The monitors identify the conditions by analyzing data that the monitoring service 119 collects from monitoring agents. Monitoring agents are software processes executing on various components of the physical infrastructure of the provider network 100. These monitoring agents may be implicitly associated with the components of the virtual network 111. That is, the computer systems that are part of the provider network infrastructure and that support the virtual network (e.g., by executing routing logic, hosting compute resources, etc.) are also executing these monitoring agent processes. For example, the monitoring agent 114 may be a software process executing on the same hardware that is executing the router 113 process for the virtual network 111. Although not shown, other monitoring agents may be executing alongside the gateway(s) 117 and compute instances 149, 151, 153, and 155. For purposes of managing the virtual network 111, the monitoring agents collect and report data including the network and activity information of the components of the virtual network, such as allocated IP address(es), bandwidth usage (e.g., in megabits/second), activity information (e.g., in terms of packets/second), etc. Monitoring agents may periodically report collected data to the monitoring service 119. The data may represent periodic, instantaneous measurements (e.g., point-in-time measurements), or averaged measurements over some window of time. The reported data may further include identifiers such as the identity of the specific compute instance or resource associated with the measurements. In some embodiments, the data includes identities of the customer associated with a particular compute instance or resource. In other embodiments, the monitoring service 119 requests the identity of specific customers from the hardware virtualization service 125 based on the compute instance or resource identifiers associated with the measurements as provided by the monitoring agents.

At circle '4B', the network management service 107 sends one or more messages to an execution service 119 to carry out the response action(s) to be taken when a rule is violated. The execution service 119 configures one or more enforcers 162, which are software processes that carry out the action(s) associated with a rule that has been violated. In some embodiments, the execution service 119 is a serverless compute service since the enforcers 162 are processes that only execute in response to a rule violation. A serverless compute service refers generally to a service that can automatically provision and manage computing resources used to execute program code that includes logic that indicates when it should be executed. For example, an enforcer 162 associated with a particular rule may include logic that indicates the enforcer 162 should be executed when the execution service 119 receives a message from a monitor 120 that identifies the particular rule.

At some point in time, the virtual network participant "A" 121 decides to launch a new instance connected to the virtual network 111. To do so, the virtual network participant 121 communicates with the hardware virtualization service 125 via an electronic device 123 and one or more APIs 127, as indicated at circle '5'. The API(s) 127 and hardware virtualization service 125 allow the virtual network participant 103 to launch compute resources within the provider network 100, including compute resources connected to the virtual network 111. In some embodiments, the hardware virtualization service 125 and the network management service 107 are part of the same service that controls the launch, configuration, and termination of such resources. In some embodiments, the API(s) 127 allow the virtual network participant 103 to request a list of available shared virtual networks within which the virtual network participant 103 can launch instances. At circle '6', and in response to receiving the request to launch a new instance, the hardware virtualization service 125 identifies host system 131 as having capacity for another compute instance and launches compute instance 133 having a logical network interface 134 that connects the instance to the virtual network 111. The host system 131 further includes other network interfaces 139 that are logically and physically connected to other networks, including the provider network 100. These other network interfaces may be logical network interfaces connecting other compute instances hosted within the host system 131 (not shown) to other virtual networks, or the physical network interfaces that connect the host system to the provider network 100. The host system 131 further includes a monitoring agent 135 that, like the monitoring agents described above, reports network activity data associated with the compute instances, including compute instance 133, that are supported by host system 131.

At circle '7', the hardware virtualization service 125 sends a message to the network management service 107 to notify it of the launch and connection of compute instance 133 to the virtual network 111. In some embodiments, the message includes a resource identifier that identifies the compute instance 133 within the provider network and a customer identifier that identifies the virtual network participant 121. The network management service 107 can access the policy or policies associated with the virtual network 111 and their associated rules. Based on the rules, the network management service 107 messages the monitoring service 119 and the execution service 161 to configure monitor(s) 120 and enforcer(s) 162 associated with the compute instance 133, as indicated at circles '8A' and '8B'.

To support monitoring the network activity of a particular compute instance connected to the virtual network 111, at least one monitoring agent is positioned at a location within the provider network 111 that can observe the traffic to or from the compute instance. For example, in some embodiments the monitoring agent 114 associated with the router 113 monitors the network activity associated with each of the compute instances that have traffic routed through the router 113. In other embodiments, the monitoring agents associated with the host systems supporting the compute instances, such as the monitoring agent 135 within host system 131, monitor the network activity associated with each of the compute instances connected to the virtual network. The monitoring agents report the observed network activity to the monitoring service 119, as indicated at circles '9A' and '9B'.

In this example, the compute instance 133 violates one of the rules of the virtual network 111. A monitor 120 detects the violation based on the reported network activity, causing a message to be sent from the monitoring service 119 to the execution service 161, as indicated at circle '10'. In response to receipt of the message, an enforcer 162 associated with the rule cause the action(s) associated with the rule to be carried out. For example, the monitoring agent 135 or 114 may send data to the monitoring service 119 indicating that the compute instance 133 has averaged in excess of 100 megabits/second (Mb/s) over the last reporting period. If a monitor 120 is monitoring the bandwidth consumption of the compute instance 133 for consumption in excess of 25 (Mb/s) for a reporting period, the conditions associated with the rule are satisfied, causing the message to be sent to the execution service 161. In an exemplary embodiment, that message includes a rule identifier and the identity of the compute instance that violated the rule. Based on the rule identifier, the execution service 125 identifies the enforcer 162 to be executed. The enforcer 162 may be configured to cause all network traffic originating from the offending compute instance to be discarded in response to the rule violation. To achieve this, the enforcer 162 sends a message to an agent (not shown) at either end of the logical link between the compute instance 133 and the virtual network 111, as indicated at circles '11A' and '11B'. In some embodiments, the agent that discards network traffic from the compute instance 133 is the host system 131. In other embodiments, the agent that discards network traffic from the compute instance is the router 113.

In some embodiments, the monitoring service 119 also sends a message to a notifications service 193 to send one or more messages (e.g., to the virtual network owner, the virtual network participant). The message may include details regarding the violation, such as the identity of the compute instance that caused the violation, the identity of the virtual network participant that owned the violating compute instance, a description of the responsive action taken, etc. The notifications service 193 may send the message(s) via various communications channels, such as electronic mail, an internal provider network message system, SMS, etc.

FIG. 2 illustrates a set of rules that regulate the network activity of compute resources connected to the virtual network according to some embodiments. A virtual network owner configures the rules via the network management service 107. A virtual network participant or potential participant may request the rules applicable to a particular virtual network from the network management service 107. In this exemplary set of rules, each rule includes a virtual network identifier 205, a rule identifier 210, one or more participant identifiers 215, one or more resource identifiers 220, one or more metrics 225 on which the rule is based, one or more conditions 230 that indicate a violation of the rule, one or more actions 235 to be taken in response to a rule violation, one or more action parameters 240 that modify the action(s) 235, and an expiration 245.

The virtual network identifier 205 identifies the specific virtual network within the provider network 100 to which the rule applies. The rule identifier 210, which may be automatically assigned by the network management service 107 when a virtual network owner creates a rule, can be used to identify the rule in messaging amongst the various services (e.g., in the message from the monitoring service 119 to the execution service 161). The virtual network owner may specify whether the rule is applied globally within the virtual network or to specific participants with the one or more participant identifiers 215. Likewise, the virtual network owner may specify whether the rule is applied globally or to specific compute resources or instances within the virtual network with the one or more resource identifiers 220. The one or more metrics 225 on which the rule is based identify the network activity that the monitor(s) 120 configured for the rule analyze. Exemplary metrics include bandwidth consumption, packet rate, IP address allocations, and network traffic types. Traffic may be analyzed based on packet inspection or port(s). The one or more conditions 230 indicate the triggers or thresholds at which the rule is violated. The one or more actions 235 specify one or more actions that the enforcer(s) 162 associated with the rule should take in response to the rule violation in order to isolate or otherwise limit one or more compute resources ability to negatively impact the virtual network. Exemplary actions include throttling performance, disconnecting network interfaces, dropping traffic, redirecting traffic to another device (e.g., to a service or data store for analysis), and/or limiting network destinations. In some embodiments, the action taken may be disconnection or isolation of all of a participant's compute instances connected to the virtual network in response to a violation by a single compute instance. The one or more action parameters 240 modify the action(s) taken in response to the rule violation. For example, the parameters may modify the scope of an action (e.g., by whitelisting or blacklisting specified activities, throttling the network performance, etc.). The expiration 245 allows the virtual network owner to set an expiration of the rule (e.g., some duration after the creation of the rule).

Exemplary rule 250 applies a bandwidth limit of 100 Mb/s to a set of participants and resources within the virtual network and has an expiration date. A violation of rule 250 results in a source limit of the resource violating the rule that prevents all traffic originating from the resource with the exception of secure shell (SSH) traffic. Exemplary rule 255 applies a 10 Mb/s limit of Hypertext Transfer Protocol (HTTP) traffic globally to all participants and resources on the virtual network (as indicated by the '*' in fields 215 and 220). A violation of rule 255 results in a throttling of HTTP traffic originating from the violating resource to 2 Mb/s. Exemplary rule 260 applies a global limit of 5 the number of IP addresses that a participant or resource can consume within the virtual network (whether by a single resource or by multiple resources owned by the same participant). A violation of the rule results in the disconnection of the network interface that resulted in the resource or participant exceeding the limit and a notification being sent to the participant. Exemplary rule 265 applies a 1,000 transactions/second (t/s) and 100 Mb/s limit to any of the compute resources associated with the participant identified in field 215. A violation of rule 265 results in a global source limit (applying to all of the participant's compute resources or instances), with no exceptions. Exemplary rule 270 applies a 1,000 t/s limit to the combination of the network traffic of two resources as identified in field 220. A violation of the rule limits prevents the identified resources from reaching certain destinations within the virtual network (a gateway and a subnet).

Figure 3:
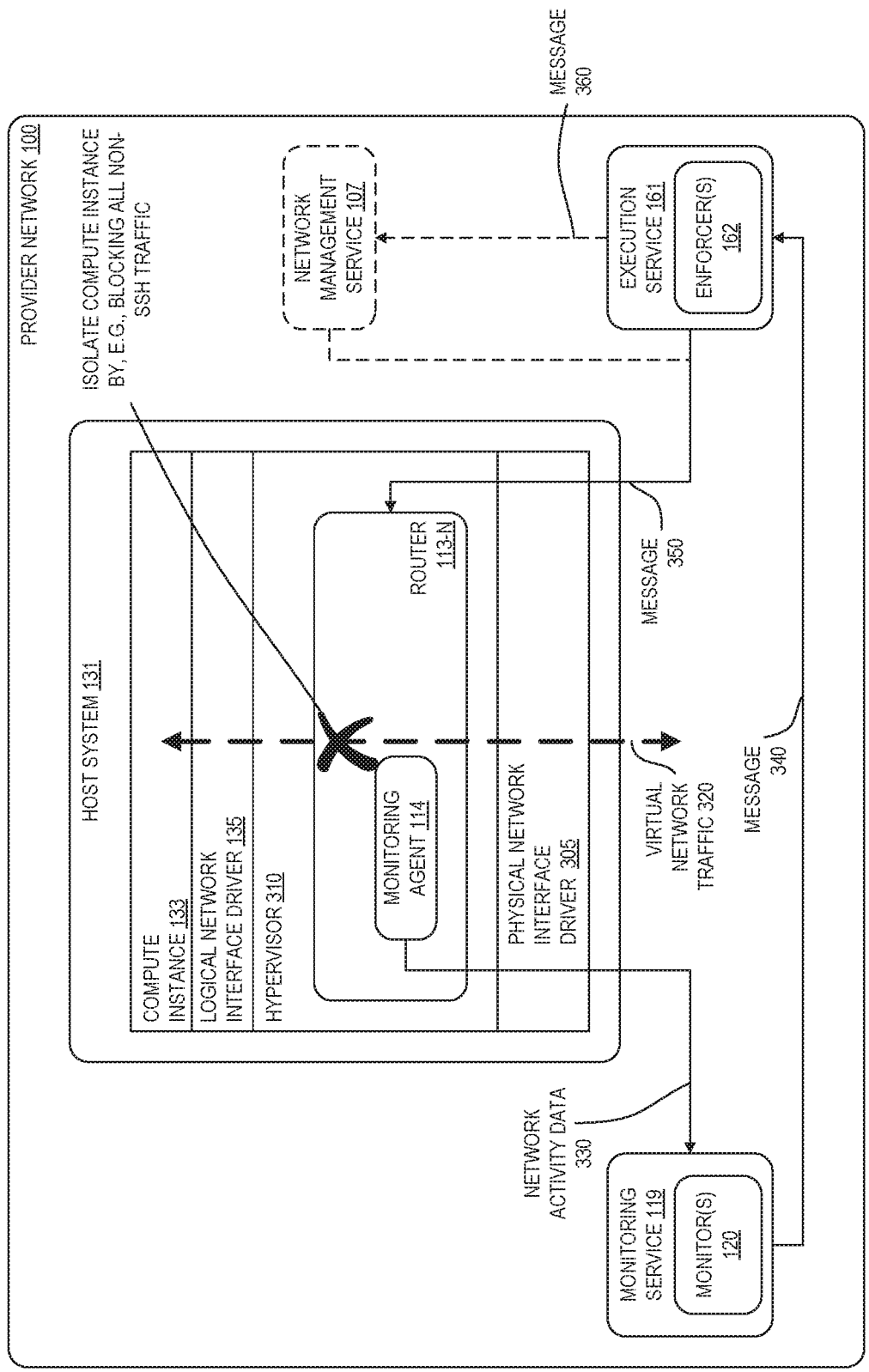
FIG. 3 illustrates an arrangement of components within the provider network that regulate the virtual network activity according to some embodiments.

FIG. 3 illustrates an arrangement of components within the provider network that regulate the virtual network activity according to some embodiments. In the illustrated embodiment, an exemplary software stack, executed by host system 131, includes the compute instance 133, a logical network interface driver 135 (which may be part of the compute instance 133), a hypervisor 310, and a physical network interface driver 305 (which may be part of the hypervisor 310). In this embodiment, a portion of the router 113 of FIG. 1 is implemented as part of the hypervisor 310 as a distributed router 113-N. In other words, each of the host systems, such as host system 131, that host compute instances connected to the virtual network include routing logic for the hosted compute instance(s). The illustrated software processes are executed by one or more processors. In one embodiment, each of the illustrated software processes are executed by a single processor. In another embodiment, the compute instance 133 and logical network interface driver 135 are executed by one or more processors, and the hypervisor 310 and the physical network interface driver 305 are executed by a separate one or more processors. Data traffic 320 between the compute instance 133 and the virtual network originates or terminates within the compute instance 133, passing through the logical network interface driver 135, the hypervisor 310, the router 113-N, and the physical network interface driver 305.

The collecting, monitoring, and enforcement processes described above are carried out as follows in the embodiment illustrated in FIG. 3. A monitoring agent 114 is part of or coupled to the router 113-N. The monitoring agent 114 sends messages 330 including the virtual network activity data of the compute instance 133 to the monitoring service 119. One or more monitors 120 examine the network activity data for violations of the rule(s) associated with virtual network. In response to a rule violation by the compute instance 133, the monitor 120 sends a message 340 to the execution service 161, the message including an identifier of the compute instance 133, optionally including an identifier of the host system 131, and an identifier of the rule that was violated. An enforcer 162 associated with identified rule sends a message 350 to an agent, in this case the router 113-N, to isolate the compute instance 133 by blocking all non-SSH traffic. In other embodiments, the enforcer 162 sends a message 360 to the network management service 107 which in turn sends the message 350 to the router 113-N.

Figure 4:
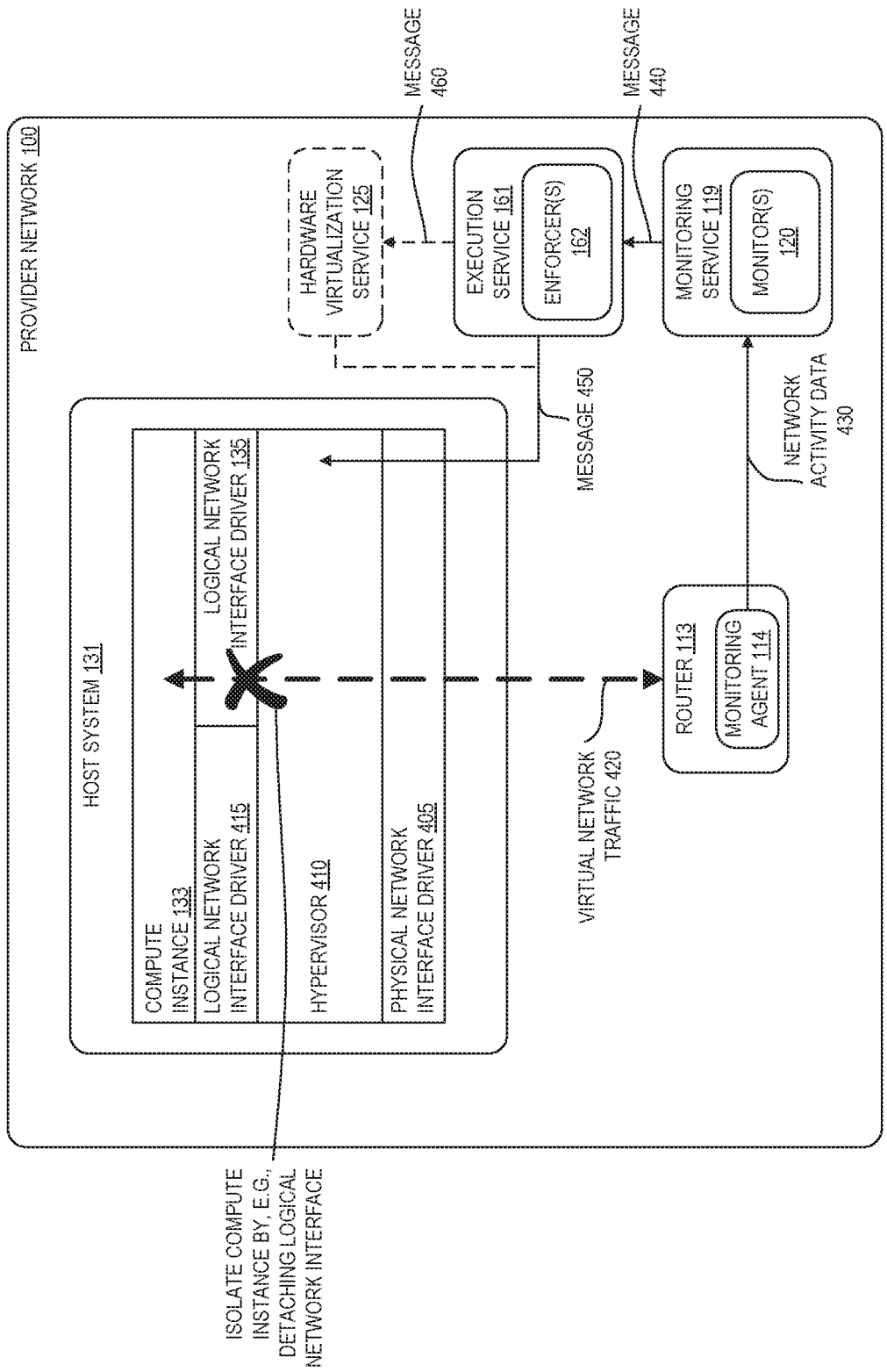
FIG. 4 illustrates another arrangement of components within the provider network that regulate the virtual network activity according to some embodiments.

FIG. 4 illustrates another arrangement of components within the provider network that regulate the virtual network activity according to some embodiments. In the illustrated embodiment, an exemplary software stack, executed by host system 131, includes the compute instance 133, logical network interface drivers 135 and 415 (which may be part of the compute instance 133), a hypervisor 410, and a physical network interface driver 405 (which may be part of the hypervisor 410). Logical network interface driver 413 may connect the compute instance 133 to the provider network 100 or another virtual private network (not shown). In this embodiment, the router 113 is a separate hardware system than the host system 131 within the provider network 100. Again, the illustrated software processes are executed by one or more processors. Data traffic 420 between the compute instance 133 and the virtual network originates or terminates within the compute instance 133, passing through the logical network interface driver 135, the hypervisor 410, the physical network interface driver 405, and the router 113.

The collecting, monitoring, and enforcement processes described above are carried out as follows in the embodiment illustrated in FIG. 4. A monitoring agent 114 is part of or coupled to the router 113. The monitoring agent 114 sends messages 430 including the virtual network activity data of the compute instance 133 to the monitoring service 119. One or more monitors 120 examine the network activity data for violations of the rule(s) associated with virtual network. In response to a rule violation by the compute instance 133, the monitor 120 sends a message 440 to the execution service 161, the message including an identifier of the compute instance 133, optionally including an identifier of the host system 131, and an identifier of the rule that was violated. An enforcer 162 associated with identified rule sends a message 450 to an agent, in this case the hypervisor 410, to detach the logical network interface 135 from the compute instance 133. In some embodiments, the enforcer 162 sends a message 460 to the hardware virtualization service 125 which in turn sends the message 450 to the hypervisor 410.

Figure 5:
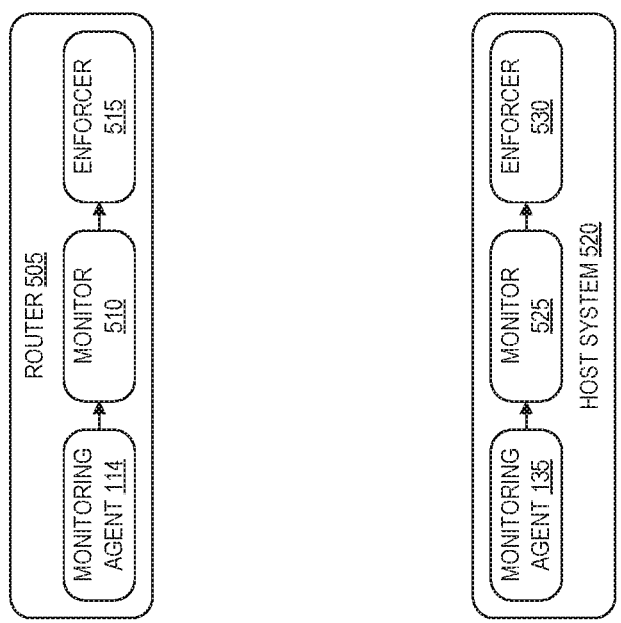
FIG. 5 illustrates another arrangement of components within the provider network that regulate the virtual network activity according to some embodiments.

FIG. 5 illustrates another arrangement of components within the provider network that regulate the virtual network activity according to some embodiments. A router 505 includes a monitoring agent 114, a monitor 510, and an enforcer 515. Similarly, a host system 520 includes a monitoring agent 135, a monitor 525, and an enforcer 530. The monitors 510 and 525 monitor network activity data received from the monitoring agents 114, 135, respectively, as was the case for the monitors 120 described above. Similarly, the enforcers 515 and 530 receive a message from the monitors 510 and 525, respectively, that causes the appropriate actions to be taken in response to a rule violation, as was the case for the enforcers 162 described above. The illustrated embodiment of a router 505 and host system 520 avoid the messaging traffic within the provider network 100 that was described above with reference to FIG. 1. Instead, the collecting, monitoring, and enforcement processes are all performed locally at the logical endpoint of the virtual network connection to reduce the delay between the occurrence of network activity that violates a rule and the associated responsive action. In some embodiments, the network management service 107 configures the monitors 510, 525 and enforcers 515, 530 during the creation of the network (e.g., for global rules) and each time a compute instance launches within or is connected to the virtual network.

Although FIGS. 1 and 3-5 illustrate various arrangements of the collecting, monitoring, and enforcement processes within the provider network, other arrangements are possible.

Figure 6:
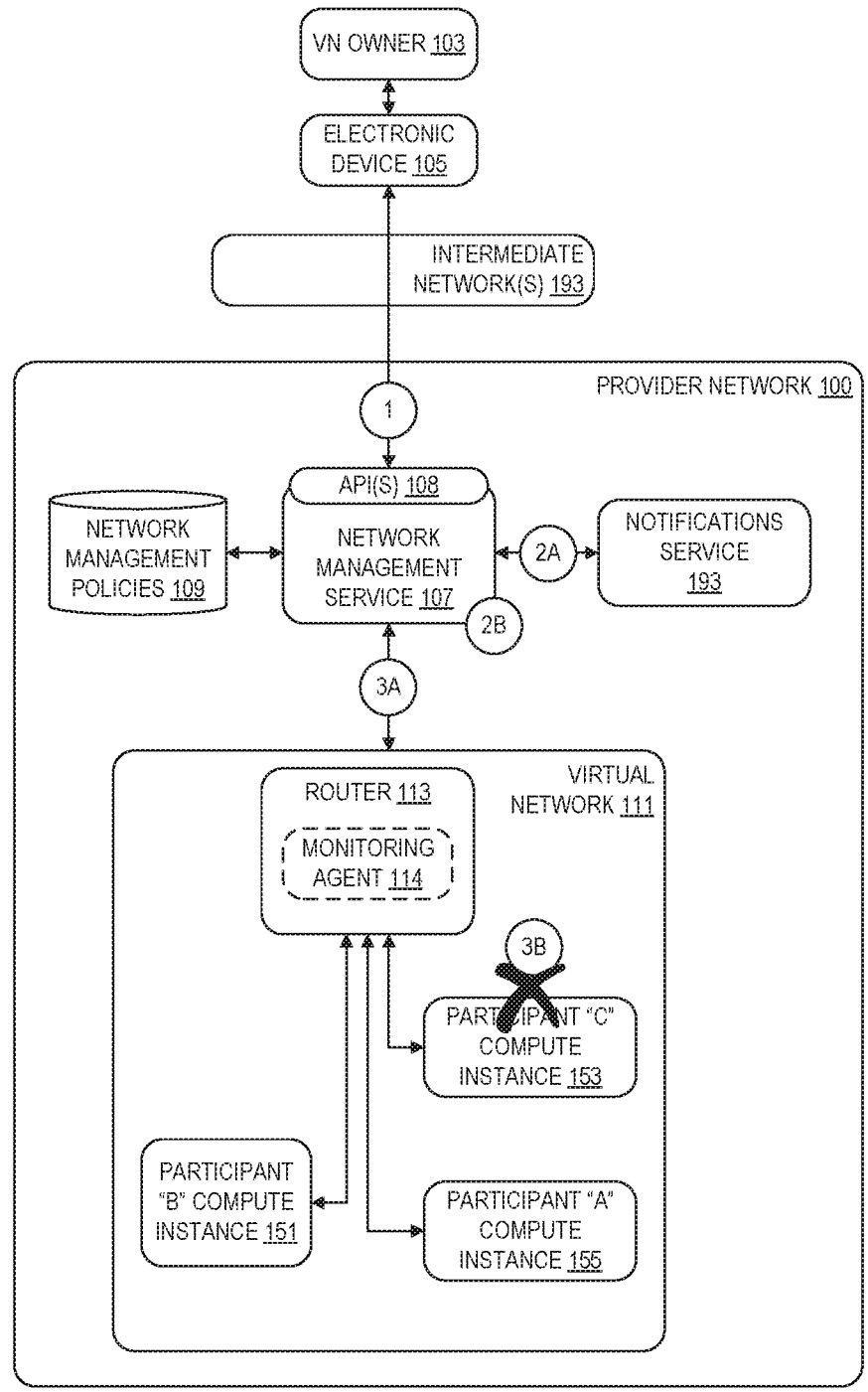
FIG. 6 illustrates an environment for limiting disconnection or isolation of a compute resource coupled to a virtual network according to some embodiments.

FIG. 6 illustrates an environment for limiting disconnection or isolation of a compute resource coupled to a virtual network according to some embodiments. In some scenarios, a virtual network owner may wish to provide assurances to existing or potential virtual network participants that their compute resources will not be disconnected from the virtual network without warning. In addition to the rules that regulate network activity, the virtual network owner may specify rules that regulate disconnections in situations where virtual network participants have not violated any of the rules regulating network activity. The virtual network owner can configure these owner-initiated disconnection rules to apply to specifically identified participants and/or resources or may apply globally to all participants of the virtual network. The rules further specify a duration that indicates the amount of time that must lapse between a virtual network owner notifying a participant that a resource will be disconnected from or isolated within the network before and the actual disconnection or isolation.

As indicated at circle '1', the virtual network owner sends a command to the network management service 107 via the electronic device 105, one or more intermediate networks 193, and API(s) 108 to disconnect a particular compute resource from the network. In this case, the particular compute resource is compute instance 153. In response to receiving the command, the network management service 107 checks for any applicable owner-initiated disconnect rules in the network management policies 109 (e.g., that apply globally or to participant "C" that operates the compute instance 153). Assuming such a rule is in place, at circle '2A', the network management service 107 sends a message to the notifications service 193 to cause the notifications service 193 to send an impending disconnect or isolation notification to the impacted participant. At circle '2B', the network management service 107 starts a timer to measure the amount of time that has lapsed since the notification was initiated. Once the duration associated with the owner-initiated disconnect rule has lapsed, the network management service 107 disconnects or causes the compute instance 153 to be disconnected form the virtual network 111, as indicated by circles '3A' and '3B'. The disconnection may be carried out by, e.g., reconfiguring the router 113 to discard all traffic to or from the compute instance 153, or causing a command to be sent to the host system associated with the compute instance 153 to detach a logical network interface connecting the compute instance 153 to the virtual network 111.

Figure 7:
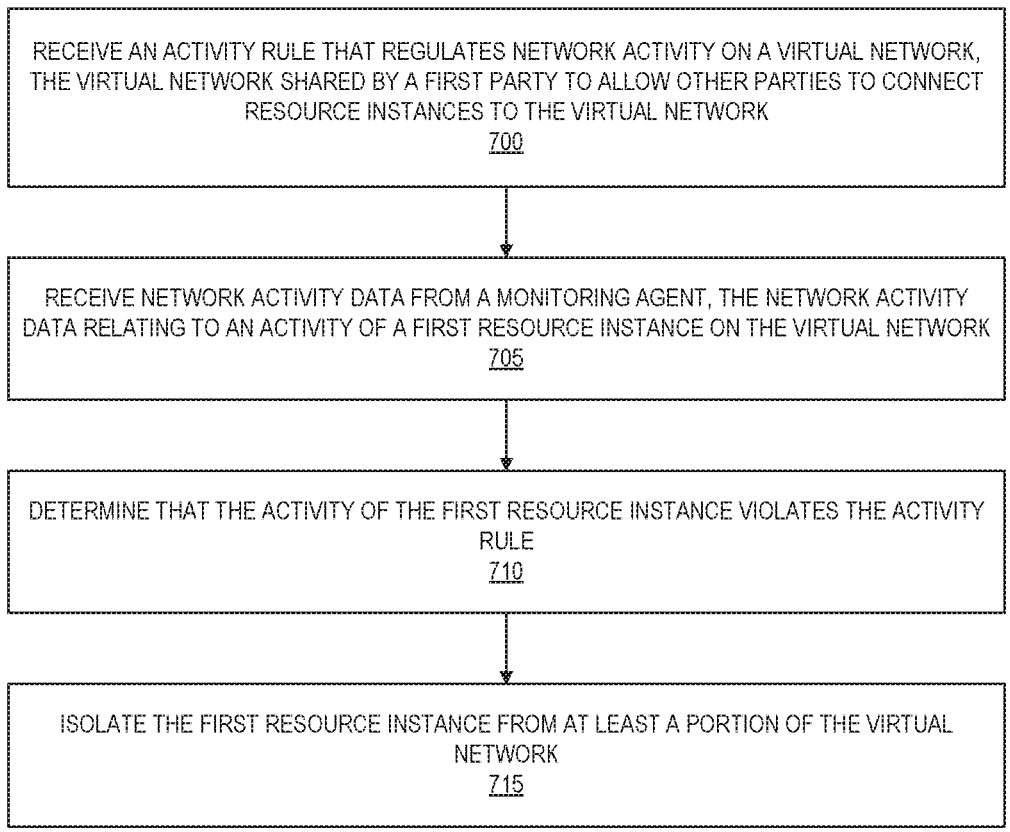
FIG. 7 is a flow diagram illustrating operations of a method for isolating a compute resource coupled to a virtual network according to some embodiments.

FIG. 7 is a flow diagram illustrating operations of a method for isolating a compute resource coupled to a virtual network according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by computer systems executing the services, processors, and/or agents described above with reference to the other figures.

The operations include, at block 700, receiving an activity rule that regulates network activity on a virtual network, the virtual network shared by a first party to allow other parties to connect resource instances to the virtual network. For example, a virtual network owner 103 configures a virtual network 111 with a set of rules that regulate the network activity of third-party compute resources on the virtual network 111. The activity rules may be received as a command issued to an API of a provider network that provides external customers with access to services, such as a network management service. The activity rules may include a number of fields, including an identification of the conditions under which the rule is violated as well as the action(s) to be taken against the compute resource that violated the rule. A number of exemplary rules are described with reference to FIG. 2.

The operations include, at block 705, receiving network activity data from a monitoring agent, the network activity data relating to an activity of a first resource instance on the virtual network. The provider network may have monitoring agents distributed through its underlying infrastructure supporting the virtual network and also the compute instances connected to the virtual network. These monitoring agents collect and report network activity data associated with the various compute resources connected to the network, such as bandwidth consumption, packet rates, and the like. The receipt of the network activity may occur at a monitoring service 119 within the provider network.

The operations include, at block 710, determining that the activity of the first resource instance violates the activity rule. As indicated, the rule includes one or more conditions that, when met, indicate a violation. In some embodiments, one or more monitoring processes associated with the monitoring service are configured to monitor for the set of conditions that indicate a rule has been violated. Exemplary arrangements of monitoring processes are illustrated in FIGS. 1 and 3-4. In other embodiments, the monitors are locally sited alongside the monitoring agents within the provider network, as illustrated in FIG. 5.

The operations include, at block 715, isolating the first resource instance from at least a portion of the virtual network. As described above, the isolation may be limited (e.g., to a particular kind of network traffic over the virtual network) or absolute (e.g., by detaching a logical network interface connecting the compute resource that violated the rule to the virtual network). In some embodiments, an enforcer process associated with the violated rule causes the isolation to occur. In some embodiments, the isolation may occur by causing the router associated with the virtual network to sink traffic to or from the compute resource or by causing the host system in the physical infrastructure of the provider network to sink traffic to or from the compute resource.

Figure 8:
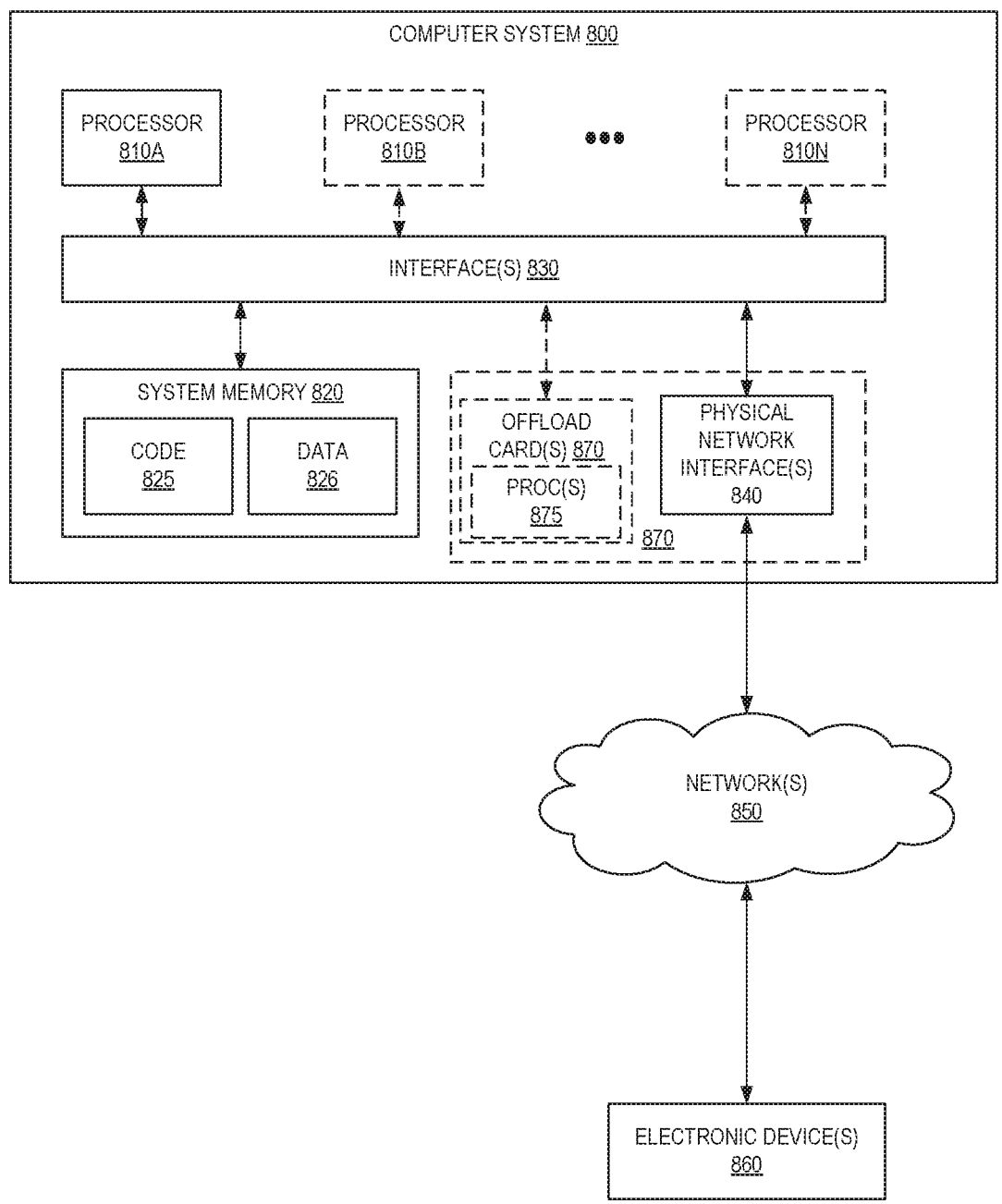
FIG. 8 is a block diagram illustrating an example computer system that may be used in some embodiments.

FIG. 8 is a block diagram illustrating an example computer system that may be used in some embodiments. Such computer systems implement the techniques for defining and enforcing a set of rules that regulate network activity on a virtual network within a provider are described as described herein. In the illustrated embodiment, computer system 800 includes one or more processors 810 coupled to a system memory 820 via an input/output (I/O) interface 830. Computer system 800 further includes a physical network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including physical network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard, PCI-Express (PCI-E) standard, QuickPath interconnect (QPI) or UltraPath interconnect (UPI), or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Physical network interface 840 may be configured to allow data to be exchanged between computer system 800 and other devices 860 attached to a network or networks 850, such as other computer systems or devices as illustrated in FIG. 1, for example. In various embodiments, physical network interface 840 may support communication via any suitable wired or wireless general data networks, such as types of Ethernet network, for example. Additionally, physical network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload processors 875 coupled to the I/O interface 830. The offload processor(s) 875 may reside on one or more offload cards 870 and may be combined with the one or more physical network interfaces 840). In some embodiments the computer system 800 acts as a host electronic device (e.g., operating as part of a hardware virtualization service) that hosts compute instances, and the one or more offload processors 875 aid in the management of compute instances that execute on the host electronic device. As an example, in some embodiments the offload processor (s) 875 can perform compute instance management operations such as pausing and/or un-pausing compute instances, launching and/or terminating compute instances, performing memory transfer/copying operations, etc. In some embodiments, the management operations may be performed by the offload processor(s) 875 in coordination with a hypervisor (e.g., upon a request from a hypervisor) that is executed by the other processors 810A-810N of the computer system 800. In other embodiments the virtualization manager implemented by the offload processor(s) 875 can accommodate requests from other entities (e.g., from compute instances themselves), and may not coordinate with (or service) any separate hypervisor. Operations performed by the offload processor(s) 875 can include the collecting, monitoring, and enforcement processes described herein.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM) etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via physical network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving an activity rule that regulates network activity on a virtual network within a provider network, the virtual network shared by a first customer of the provider network to allow other customers of the provider network to connect resource instances to the virtual network;
   receiving network activity data from a monitoring agent within the provider network, the monitoring agent executing as part of a distributed router at least a portion of which is implemented in a hypervisor of a host system hosting a first resource instance, the network activity data relating to an activity of a first resource instance of a first other customer on the virtual network, wherein portions of the distributed router are implemented in a plurality of hypervisors of a plurality of host systems that host resources connected to the virtual network;
   determining that the activity of the first resource instance violates the activity rule;
   sending a message to an execution service including an identifier of the first resource instance, an identifier of a host system hosting the first resource instance, and an identifier of the activity rule;
   sending, by an enforcer of the execution service, a message to the hypervisor of the host system instructing the host system to detach a logical network interface connecting the first resource instance to the virtual network, the host system including a plurality of logical network interfaces; and
   detaching a first logical network interface connecting the first resource instance to the virtual network, wherein the first resource instance remains connected to the provider network via a second logical network interface.

2. The computer-implemented method of claim 1, wherein the first resource instance remains connected to another virtual network of the first other customer by another logical network interface.

3. The computer-implemented method of claim 1, wherein the network activity data is sent through the provider network and not through the virtual network.

4. A computer-implemented method comprising:
   receiving an activity rule that regulates network activity on a virtual network in a provider network, the virtual network shared by a first party to allow other parties to connect resource instances to the virtual network;
   receiving network activity data from a monitoring agent, the monitoring agent executing as part of a distributed router at least a portion of which is implemented in a hypervisor of a host system hosting a first resource instance, the network activity data relating to an activity of the first resource instance on the virtual network, wherein portions of the distributed router are implemented in a plurality of hypervisors of a plurality of host systems that host resources connected to the virtual network;
   determining that the activity of the first resource instance violates the activity rule;
   sending a message to an execution service including an identifier of the first resource instance, an identifier of a host system hosting the first resource instance, and an identifier of the activity rule;
   sending, by an enforcer of the execution service, a message to the hypervisor of the host system instructing the host system to isolate the first resource instance from at least a portion of the virtual network; and
   isolating the first resource instance from at least the portion of the virtual network, wherein isolating the first resource instance comprises detaching a first logical network interface connecting the first resource instance to the virtual network while the first resource instance remains connected to the provider network via a second logical network interface.

5. The computer-implemented method of claim 4, wherein the first resource instance remains connected to another virtual network of a first other party by another logical network interface.

6. The computer-implemented method of claim 4, wherein isolating the first resource instance comprises dropping traffic originating from the first resource instance or redirecting traffic originating from the first resource instance to another network device.

7. The computer-implemented method of claim 4, wherein the isolation of the first resource instance is subject to certain exceptions identified in the activity rule.

8. The computer-implemented method of claim 4, wherein the monitoring agent is associated with a computer system hosting the first resource instance in a virtualized environment.

9. The computer-implemented method of claim 4, wherein the monitoring agent is associated with a router of the virtual network.

10. The computer-implemented method of claim 4, wherein the first resource instance is of a first other party identified in the activity rule.

11. The computer-implemented method of claim 4, further comprising:
    receiving a request from the first party to disconnect a second resource instance of a first other party from the virtual network;
    sending a notification to the first other party; and
    disconnecting the second resource instance from the virtual network after a duration of time has elapsed from the sending of the notification.

12. The computer-implemented method of claim 4, wherein the network activity data is sent through a provider network and not through the virtual network.

13. A system comprising:
    a monitoring agent implemented by a first one or more electronic devices that are hosting a first resource instance connected to a virtual network within a provider network; and
    a virtual network management service implemented by a second one or more electronic devices, the virtual network management service including instructions that upon execution cause the second one or more electronic devices to:
        receive an activity rule that regulates network activity on the virtual network, the virtual network shared by a first party to allow other parties to connect resource instances to the virtual network;
        receive network activity data from a monitoring agent, the monitoring agent executing as part of a distributed router at least a portion of which is implemented in a hypervisor of a host system hosting a first resource instance, the network activity data relating to an activity of the first resource instance on the virtual network, wherein portions of the distributed router are implemented in a plurality of hypervisors of a plurality of host systems that host resources connected to the virtual network;
        determine that the activity of the first resource instance violates the activity rule;
        send a message to an execution service including an identifier of the first resource instance, an identifier of a host system hosting the first resource instance, and an identifier of the activity rule;
        send, by an enforcer of the execution service, a message to the hypervisor of the host system instructing the host system to isolate the first resource instance from at least a portion of the virtual network; and
        cause the first one or more electronic devices to isolate the first resource instance from at least a portion of the virtual network wherein isolating the first resource instance comprises detaching a first logical network interface connecting the first resource instance to the virtual network while the first resource instance remains connected to the provider network via a second logical network interface.

14. The system of claim 13, wherein the first resource instance remains connected to another virtual network of a first other party by another logical network interface.

15. The system of claim 13, wherein to isolate the first resource instance is to drop traffic originating from the first resource instance or redirect traffic originating from the first resource instance to another network device.

16. The system of claim 13, wherein the isolation of the first resource instance is subject to certain exceptions identified in the activity rule.

17. The system of claim 13, further comprising a router implemented by the first one or more electronic devices.

18. The system of claim 13, wherein the first resource instance is of a first other party identified in the activity rule.

\* \* \* \* \*